(12) United States Patent
Spahn

(10) Patent No.: US 8,064,715 B2
(45) Date of Patent: Nov. 22, 2011

(54) METHOD FOR NON-LINEAR IMAGE PROCESSING, AND A FLAT DETECTOR HAVING A CORRECTION UNIT

(75) Inventor: Martin Spahn, Chicago, IL (US)

(73) Assignee: Siemens Aktiengesellschaft, Munich (DE)

( * ) Notice: Subject to any disclaimer, the term of this patent is extended or adjusted under 35 U.S.C. 154(b) by 1036 days.

(21) Appl. No.: 11/481,178

(22) Filed: Jul. 6, 2006

(65) Prior Publication Data

US 2007/0009174 A1    Jan. 11, 2007

(30) Foreign Application Priority Data

Jul. 7, 2005 (DE) .................. 10 2005 031 903

(51) Int. Cl.
*G06K 9/40* (2006.01)
(52) U.S. Cl. .................. 382/274; 382/132; 382/128
(58) Field of Classification Search .................. 382/274, 382/132
See application file for complete search history.

(56) References Cited

U.S. PATENT DOCUMENTS

| | | | |
|---|---|---|---|
| 4,200,934 A | | 4/1980 | Hofmann |
| 4,217,641 A | * | 8/1980 | Naparstek .................. 382/131 |
| 5,155,586 A | * | 10/1992 | Levy et al. .................. 348/104 |
| 5,166,783 A | * | 11/1992 | Hodgson .................. 348/104 |
| 2006/0011853 A1 | * | 1/2006 | Spartiotis et al. .................. 250/370.13 |
| 2006/0280360 A1 | * | 12/2006 | Holub .................. 382/162 |

FOREIGN PATENT DOCUMENTS

| | | |
|---|---|---|
| DE | 27 14 777 A1 | 10/1978 |
| DE | 37 33 074 C2 | 3/1993 |

OTHER PUBLICATIONS

Vien Cheung et al, A comparative study of the characterization of colour cameras by means of neural networks and polynomial transforms, Coloration Technology 2004.*
Wikipedia, article: Video Graphics Array.*
Ramabadran (Tenkasi Ramabadran et al, A Tutorial on CRC Computations, IEEE 1988).*
German Search Report for corresp. App 10 2005 031 903.3-53, Apr. 3, 2006.

* cited by examiner

*Primary Examiner* — Wesley Tucker
*Assistant Examiner* — Mark Roz
(74) *Attorney, Agent, or Firm* — Harness, Dickey & Pierce, PLC

(57) ABSTRACT

To improve the image quality of X-ray images recorded by way of flat detectors, a method for non-linear image processing is provided. An X-ray raw image which is read from a pixel matrix is converted to an X-ray image, wherein the pixel matrix contains pixel elements of a bit depth which is considerably less than the number of pixel elements. A final value is determined for each raw value and can be calculated by use of a non-linear image processing algorithm. Table values are called up and used at least in some cases for the determination of the final values. The table values are associated in a table with corresponding bit values, the maximum number of which is defined by the bit depth.

23 Claims, 1 Drawing Sheet

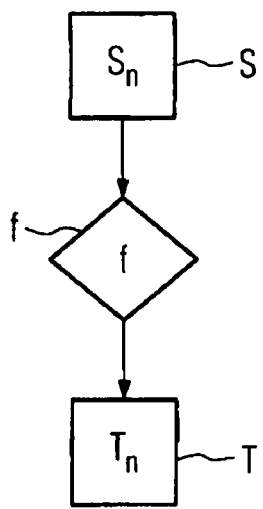
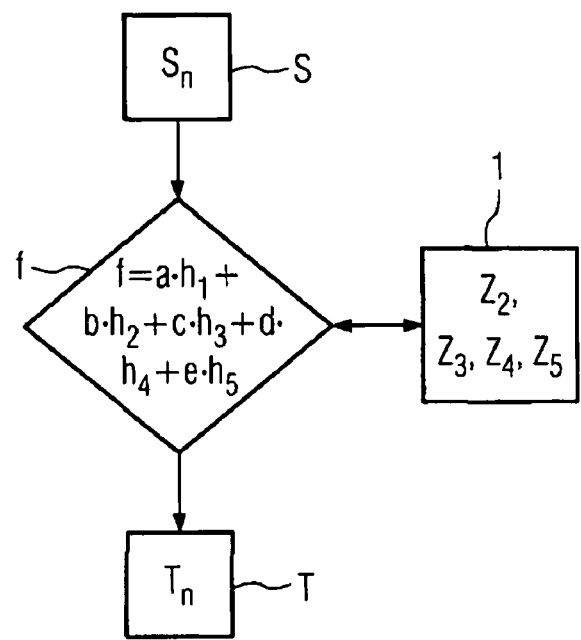
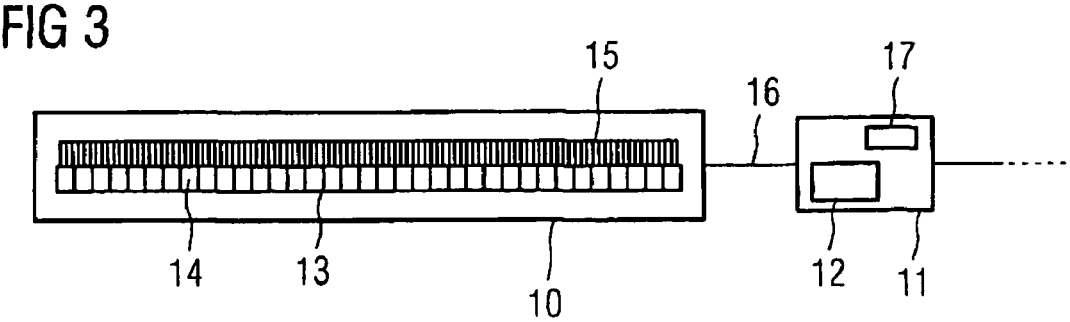

METHOD FOR NON-LINEAR IMAGE PROCESSING, AND A FLAT DETECTOR HAVING A CORRECTION UNIT

PRIORITY STATEMENT

The present application hereby claims priority under 35 U.S.C. §119 on German patent application number DE 10 2005 031 903.3 filed Jul. 7, 2005, the entire contents of which is hereby incorporated herein by reference.

FIELD

The invention generally relates to a method for non-linear image processing, and/or to a flat detector having a correction unit.

BACKGROUND

So-called digital flat detectors for recording digital X-ray images of an object are known in X-ray imaging, in which X-ray radiation is converted by a scintillator layer or a direct converter layer to an electrical charge and is then electronically read by way of so-called active pixel matrices, for example composed of amorphous silicon (a-Si), subjected to analogue-digital conversion, and further-processed as a so-called X-ray raw image for image production.

Because of the specific characteristics of the flat detector, it is necessary in order to achieve an X-ray image that is as good as possible to subject the image information that has been read to post-processing. Offset corrections and gain corrections are typically carried out, as well as defect corrections and line noise corrections as well.

Offset correction compensates for temporary changes in the dark current behavior of the pixel elements, of which the active pixel matrix is composed. For this post-processing, a blank offset correction image is recorded without any X-ray radiation present, and this is subtracted in a known manner from a subsequent X-ray raw image, with the aid of an image processing method. The gain correction is used to compensate for sensitivity fluctuations from one pixel element to another. In this case, a known multiplication method is carried out on the X-ray image, which has already been subjected to offset correction, with the aid of a gain correction image.

Overall, the combined offset and gain correction, the so-called flat-field correction, can in general be described as follows: $T=G \cdot [S-O]$ and $T_n=G_n \cdot [S_n-O_n]$, respectively, where S represents the X-ray raw image, $S_n$ represents the raw value related to the respective pixel element n, O the offset correction image and $O_n$ the offset value, G the gain correction image and $G_n$ the gain value, T the corrected X-ray image and $T_n$ the corrected final value. Nowadays, offset and gain corrections are normally linear corrections.

However, flat detectors image a very wide dynamic range, over which the flat detector is in general no longer linear; in addition, non-linearities vary locally, that is to say from one pixel element to another or from one pixel row to another. Particularly in the case of X-ray doses which are very much higher or very much lower than the dose in which, for example, the gain image was produced, the local non-linearities can lead to artifacts being visible in the linearly corrected X-ray image. Non-linear corrections are admittedly known, but they are virtually unusable because of the large amounts of data, particularly in the case of fluoroscopy applications, in which up to 30 X-ray images are produced per second.

SUMMARY

A method and an apparatus are provided which, in at least one embodiment, allow non-linear image processing, in particular a correction, to be carried out with less complexity and in less time.

According to at least one embodiment of the invention, a method is for non-linear image processing, and/or a flat detector includes a correction unit.

Bit depth was discovered, that is to say the number of graduations or bit values which can be indicated by a flat detector (for example raw values $S_n$ or offset value $O_n$), to be small in comparison to the number of pixel elements even in the case of a flat detector with a wide dynamic range (bit depth). The bit depth is thus also small in comparison to the frequency with which a calculation must be carried out by means of a non-linear image processing algorithm for an entire X-ray image, since the calculation must be carried out individually for each pixel element.

In the case of the method according to at least one embodiment of the invention, table values are called up and used for the conversion of a raw image, which has been read from the pixel matrix, to an X-ray image, and in particular for determination of corresponding final values from raw values, with the table values being associated with corresponding bit values in a table. According to one refinement of at least one embodiment of the invention, the table values are called up and used for determination of the final values, instead of a calculation by way of the non-linear image processing algorithm.

Depending on the application, it is either possible to dispense entirely with an on-line calculation, or to use a combination of a call and use of table values and on-line calculation, for determination of the final values from the raw values. The expression raw values include the bit values which have been read from the individual pixel elements, while the expression final values include the bit values which result from the non-linear image processing and, for example, have been corrected.

An advantage of the method according to at least one embodiment of the invention can include a considerable reduction in the computation complexity, since table values just have to be called up from the table, but do not have to be recalculated for each pixel element. In comparison to a complete on-line calculation (that is to say a calculation during a recording situation) this simplification of the final values of all the pixel elements results in a considerable saving in terms of time and effort. In particular, at least one embodiment of the invention for the first time allows practical use and rapid implementation of non-linear image processing and the associated image processing algorithm.

A method according to at least one embodiment of the invention can advantageously be used in particular for fluoroscopy applications or other applications which require a large number of images in a short time. Particularly when the non-linear image processing algorithm is intended for flat-field correction, the practical use of non-linear image processing results in a considerably better image quality of the, in particular corrected, X-ray images.

It is expedient for the table values to be available at the start of the method. According to one refinement of at least one embodiment of the invention, the method is preceded by an initial method in which the table values are calculated and are stored, associated with the corresponding bit values, in the table. The calculation and storage of the table values can be carried out, for example, during setting up or calibration of the solid-body detector. This calculation, which is carried out only once or at least with a considerably lower frequency than an on-line calculation, allows the table values for future image processing methods according to at least one embodiment of the invention to be called up in a simple manner, when required.

The non-linear image processing algorithm can expediently be separated into one or more sub-functions. By way of example, these sub-functions may be individual or collated computation operations. The separation or splitting of the image processing algorithm simplifies the prior calculation and storage of table values, and allows the method also to be used for non-linear image processing algorithms which, for example, are composed of a plurality of multiplication operations.

According to a further refinement of at least one embodiment of the invention, the table values are formed from intermediate values or final values which can be calculated by way of at least a portion of the non-linear image processing algorithm from the respective bit values. Complex calculations, which include a part of or the entire non-linear image processing algorithm, are replaced simply by calling one or more corresponding table values; a large amount of both time and computation power can be saved. Each bit value is advantageously associated with at least one table value; this ensures that the image processing process is extensively speeded up for all bit values which are in fact feasible on the basis of the bit depth of a flat detector.

One particularly advantageous use of at least one embodiment of the method is ensured by a flat detector having a pixel matrix, an associated correction unit and an associated memory unit, with the correction unit being provided for the determination of a final value for each raw value of the pixel matrix, using table values.

BRIEF DESCRIPTION OF THE DRAWINGS

The invention as well as further advantageous refinements will be explained in more detail in the following text with reference to example embodiments which are illustrated schematically in the drawings, without this representing any restriction of the invention to these example embodiments; in the figures:

FIG. 1 shows a method for non-linear image processing according to the prior art;

FIG. 2 shows a method according to an embodiment of the invention for non-linear image processing using table values which have been stored in advance in a table;

FIG. 3 shows a flat detector according to an embodiment of the invention having a correction unit and having a memory unit with table values stored in it.

DETAILED DESCRIPTION OF THE EXAMPLE EMBODIMENTS

FIG. 1 shows a method for non-linear image processing according to the prior art, in which a final value, $T_n$ is calculated with the aid of a non-linear image processing algorithm f from a raw value $S_n$ of a pixel element n in the pixel matrix, with all of the computation operations being carried out in series. This is done for all the pixel elements n in the pixel matrix. The number of pixel elements n in the case of relatively modern flat detectors is relatively high in order to achieve good resolution, for example $2000 \cdot 2000 = 4000000$ pixel elements.

If the non-linear image processing algorithm f for flat-field correction is, for example, formed by a 5th-order polynomial, from which:

$$T_n = f(S_n)$$
$$= a_n \cdot [S_n - O_n] + b_n \cdot [S_n - O_n]^2 + c_n \cdot [S_n - O_n]^3 + d_n \cdot [S_n - O_n]^4 + e_n \cdot [S_n - O_n]^5$$

then 5 subtraction operations, 15 multiplication operations and 4 addition operations must be carried out for each individual one of the four million pixel elements. Particularly in the case of fluoroscopy applications in which up to 30 X-ray images are produced per second, this means an enormous computation complexity, which cannot be coped with. In this case, multiplication operations are particularly computation-intensive operations. The calculations are in general carried out by a calculation unit, for example a computer or a correction unit.

FIG. 2 shows a method according to an embodiment of the invention for non-linear image processing, in which, for simplicity and in order to shorten the computation time, table values which are stored in a memory unit which is connected to the calculation unit or are contained in it are called up in a table 1 and are used in order to obtain a corrected X-ray image T from a raw image S by means of a non-linear image processing algorithm f.

The discovery that the bit depth is small in comparison to the number of pixel elements n plays a role in the application, even in the case of a flat detector with a wide dynamic range. The bit depth is thus also small in comparison to the frequency with which calculations must be carried out by means of the non-linear image processing algorithm. In the case of flat detectors with grey levels, the bit depth is in general $2^{14}$ or 16384.

In order to make it possible to carry out non-linear image processing operations, in particular corrections, more quickly on-line after reading the raw image S, complex calculations, such as multiple multiplication operations, are carried out in an initial method for each possible bit value, and the results are stored as table values in a table, being associated with the respective bit values from which they are obtained. In the case of a flat detector with a grey-level resolution or bit depth of 16384, for example, the bit values are all possible grey level graduations which can occur for each pixel element; in the stated example, there are precisely 16384 different bit values.

The prior calculation, creation and storage of the table take place before image acquisition, that is to say in general before the application of X-ray radiation, in order to avoid causing any time delay in the reading or image-processing processes. The table can be calculated and created as soon as the non-linear image processing algorithm f, or at least parts of the image processing algorithm f, is or are known. In the preferred cases, the prior calculation, creation and storage of the table are carried out off-line, or they may be carried out during an initial calibration of the flat detector, or while setting up the flat detector.

In order to simplify the creation of the table, the non-linear image processing algorithm f can be separated, as far as possible, into a series of simpler sub-functions a; b; c; d; e; $h_1$; $h_2$; $h_3$; $h_4$; $h_5$. For the quoted example of a 5th-order polynomial, this appears, for example, as follows:

$$T_n = f(S_n) = a_n \cdot h_1(S_n) + b_n \cdot h_2(S_n) + c_n \cdot h_3(S_n) + d_n \cdot h_4(S_n) + e_n \cdot h_5(S_n) \text{ where } h_1 = [S_n - O_n] \text{ and so on until } h_5 = [S_n - O_n]^5.$$

According to one refinement of at least one embodiment of the invention, at least some of the sub-functions a; b; c; d; e;

$h_1$; $h_2$; $h_3$; $h_4$; $h_5$ are in the form of non-linear sub-functions $h_2$; $h_3$; $h_4$; $h_5$ in such a way that intermediate result values $Z_2$; $Z_3$; $Z_4$; $Z_5$ can be determined.

Since the raw value $S_n$ and the offset value $O_n$ as well as the difference $S_n - O_n$ in a corresponding manner as well, can assume only a large number of grade level values which correspond to the bit depth, in each case one intermediate result value $Z_2$; $Z_3$; $Z_4$; $Z_5$ is stored as a table value for $h_2$ to $h_5$ for each of these grey level values in the table in the memory unit. The table values of intermediate result values $Z_2$; $Z_3$; $Z_4$; $Z_5$ are expediently formed, and can be calculated from the respective bit values on the basis of the non-linear sub-functions $h_2$ to $h_5$.

The intermediate result values $Z_2$; $Z_3$; $Z_4$; $Z_5$ are determined in an advantageous manner, with table values being called up and used for this purpose. In the illustrated example of linear flat-field correction with the fifth-order polynomial, the calculation unit thus calls up on that table value which is stored for the bit value $S_n - O_n$ and is in the form of the intermediate result value $Z_2$; $Z_3$; $Z_4$; $Z_5$ for the 5th non-linear sub-function $h_5$ from the table, and uses this for the rest of the calculations. This is done instead of a calculation by way of the 5th non-linear sub-function $h_5$, which includes four multiplication operations.

The table values for the second non-linear sub-function $h_2$, for the third non-linear sub-function $h_3$ and for the fourth non-linear sub-function $h_4$ are called up in the same way, thus saving a total of ten multiplication operations. After this, the calculation unit then just has to carry out the other five multiplication operations and the four addition operations. The overall computation complexity is thus considerably less, and the image processing and correction can be carried out considerably more quickly. If the non-linear function f cannot be separated directly, for example in the case of a logarithmic, a root or an exponential function, then the corresponding final values $T_n$ of the corresponding function are stored in advance as table values in the table, and are called up when required. Another possibility is to first of all develop a function such as this, then to separate it, and then store intermediate result values in a table.

FIG. 3 shows a flat detector 10 according to at least one embodiment of the invention with a scintillator 15, a pixel matrix 13, an associated correction unit 11 and an associated memory unit 12, with corresponding table values being stored in the memory unit 12. By way of example, the correction unit may be connected to the flat detector 10 by means of a cable 16 or by way of a LAN without the use of wires, although it may also be physically integrated in the flat detector 10, or may be accommodated in an associated X-ray system. Once the raw image S or the raw values $S_n$ has or have been read from the individual pixel elements 14, the calculation unit 17 in the correction unit 11 determines the final values by calling up and using the table values that have been stored in the memory unit 12, as has already been described above.

At least one embodiment of the invention can be briefly summarized as follows: a method for non-linear image processing is provided in order to improve the image quality of X-ray images recorded by way of flat detectors, in which method an X-ray raw image S which has been read from a pixel matrix 13 is converted to an X-ray image T wherein the pixel matrix 13 contains pixel elements 14 of a predetermined bit depth which is considerably less than the number of pixel elements 14, wherein a final value $T_n$ is determined for each raw value $S_n$ and can be calculated by means of a non-linear image processing algorithm f, and wherein table values are called up and used at least in some cases for the determination of the final values $T_n$, which table values are associated in a table 1 with corresponding bit values, the maximum number of which is defined by the bit depth.

Further, elements and/or features of different example embodiments may be combined with each other and/or substituted for each other within the scope of this disclosure and appended claims.

Still further, any one of the above-described and other example features of the present invention may be embodied in the form of an apparatus, method, system, computer program and computer program product. For example, of the aforementioned methods may be embodied in the form of a system or device, including, but not limited to, any of the structure for performing the methodology illustrated in the drawings.

Even further, any of the aforementioned methods may be embodied in the form of a program. The program may be stored on a computer readable media and is adapted to perform any one of the aforementioned methods when run on a computer device (a device including a processor). Thus, the storage medium or computer readable medium, is adapted to store information and is adapted to interact with a data processing facility or computer device to perform the method of any of the above mentioned embodiments.

The storage medium may be a built-in medium installed inside a computer device main body or a removable medium arranged so that it can be separated from the computer device main body. Examples of the built-in medium include, but are not limited to, rewriteable non-volatile memories, such as ROMs and flash memories, and hard disks. Examples of the removable medium include, but are not limited to, optical storage media such as CD-ROMs and DVDs; magneto-optical storage media, such as MOs; magnetism storage media, including but not limited to floppy disks (trademark), cassette tapes, and removable hard disks; media with a built-in rewriteable non-volatile memory, including but not limited to memory cards; and media with a built-in ROM, including but not limited to ROM cassettes; etc. Furthermore, various information regarding stored images, for example, property information, may be stored in any other form, or it may be provided in other ways.

Example embodiments being thus described, it will be obvious that the same may be varied in many ways. Such variations are not to be regarded as a departure from the spirit and scope of the present invention, and all such modifications as would be obvious to one skilled in the art are intended to be included within the scope of the following claims.

What is claimed is:

1. A method for non-linear image processing, comprising:
   calculating table values using at least one portion of a flat-field correction non-linear image processing algorithm, the table values being associated in a table with corresponding bit values, a maximum number of the bit values being defined by a bit depth;
   storing the table values in a storage medium;
   reading an X-ray raw image from a pixel matrix;
   calling up the table values from the storage medium; and
   converting at least one raw pixel value of the X-ray raw image to a final pixel value of an X-ray image with a correction unit by calculating the final pixel value using the flat-field correction non-linear image processing algorithm and at least one of the table values, the at least one of the table values substituted in the calculation for the at least one portion,
   wherein the pixel matrix contains pixel elements of a bit depth which is considerably less than the number of pixel elements,
   the flat-field correction non-linear image processing algorithm is a polynomial function, the at least one portion is less than all of the flat-field correction non-linear image processing algorithm, and each of the table values is derived from a term of the polynomial function.

2. The method as claimed in claim 1, wherein the table values are available prior to the reading of the X-ray raw.

3. The method as claimed in claim 1, wherein the table values are intermediate result values calculated by use of the at least one portion of the non-linear image processing algorithm from bit values.

4. The method as claimed in claim 1, wherein each bit value is directly associated with at least one table value.

5. The method as claimed in claim 1, wherein the non-linear image processing algorithm is formed from an at least second-order polynomial.

6. The method as claimed in claim 1, wherein the non-linear image processing algorithm is separateable into at least one sub-function.

7. The method as claimed in claim 6, wherein the non-linear image processing algorithm is separateable into at least two sub-functions, at least some of the sub-functions being in the form of non-linear sub-functions in such a way that an intermediate result value is determined.

8. The method as claimed in claim 7, wherein the intermediate result values are determined, and the table values are called up and used for this purpose.

9. The method as claimed in claim 6, wherein the table values are intermediate result values which are calculated from the corresponding bit values on the basis of a non-linear sub-function.

10. A flat detector, comprising:
   a pixel matrix with pixel elements of a bit depth considerably less than a number of the pixel elements;
   an associated correction unit configured to convert an X-ray raw image, read from the pixel matrix, to an X-ray image via a non-linear image processing algorithm; and
   an associated memory unit configured to store table values, associated with corresponding bit values, a maximum number of which is defined by the bit depth, the correction unit configured to determine a final value for each raw value of the X-ray raw image, with the table values being called up and used in place of less than all of the non-linear image processing algorithm,
   wherein the non-linear image processing algorithm is a polynomial function, and
   each of the table values is derived from a term of the polynomial function.

11. The flat detector as claimed in claim 10, wherein the table values are available at the start of the determination.

12. The flat detector as claimed in claim 10, wherein the table values are intermediate result values calculated by use of a portion of the non-linear image processing algorithm from bit values.

13. The flat detector as claimed in claim 10, wherein each bit value is directly associated with at least one table value.

14. The flat detector as claimed in claim 10, wherein the non-linear image processing algorithm is a flat-field correction algorithm.

15. The flat detector as claimed in claim 10, wherein the non-linear image processing algorithm is formed from an at least second-order polynomial.

16. The flat detector as claimed in claim 10, wherein the non-linear image processing algorithm is separateable into at least one sub-function.

17. The flat detector as claimed in claim 16, wherein the non-linear image processing algorithm is separateable into at least two sub-functions and wherein at least some of the sub-functions are in the form of non-linear sub-functions in such a way that intermediate result values are determineable.

18. The flat detector as claimed in claim 17, wherein at least some of the table values are called up and used for determination of the intermediate result values.

19. The flat detector as claimed in claim 16, wherein the table values are intermediate result values calculated from the corresponding bit values on the basis of a non-linear sub-function.

20. A method for non-linear image processing, in which an X ray raw image read from a pixel matrix is converted to an X-ray image, the pixel matrix containing pixel elements of a bit depth which is considerably less than the number of pixel elements, the method comprising:
   determining a final value for each raw value with a correction unit, the final value calculated using a non-linear image processing algorithm;
   calling up at least one table value from a storage medium; and
   replacing less than all of the non-linear image processing algorithm with the at least one table value for the determination of the final values by the correction unit, the at least one table value being associated in a table with a corresponding bit value a maximum number of bit values being defined by the bit depth,
   wherein the non-linear image processing algorithm is a polynomial function, and
   the at least one table value is derived from a term of the polynomial function.

21. A computer readable medium including program segments for, when executed on a computer, causing the computer to implement the method of claim 20.

22. A computer readable medium including program segments for, when executed on a computer, causing the computer to implement the method of claim 1.

23. A method for non-linear image processing, comprising:
   reading an x-ray raw image from a pixel matrix containing pixel elements, the pixel elements having a bit depth which is less than a number of the pixel elements: and
   converting the x-ray raw image to an x-ray image with a correction unit, the correction unit calculating a final value for at least one raw value via a non-linear image processing algorithm, the correction unit calling up at least one table value to replace at least one portion of the non-linear image processing algorithm in the calculation, the at least one portion replacing less than all of the non-linear image processing algorithm,
   wherein the at least one table value is associated in a table with a corresponding bit value, a maximum number of which is defined by the bit depth,
   the non-linear image processing algorithm is a polynomial function, and
   the at least one table value is derived from a term of the polynomial function.

* * * * *